(No Model.)
J. REID.
PORCELAIN WASH OUT CLOSET.
No. 416,856. Patented Dec. 10, 1889.
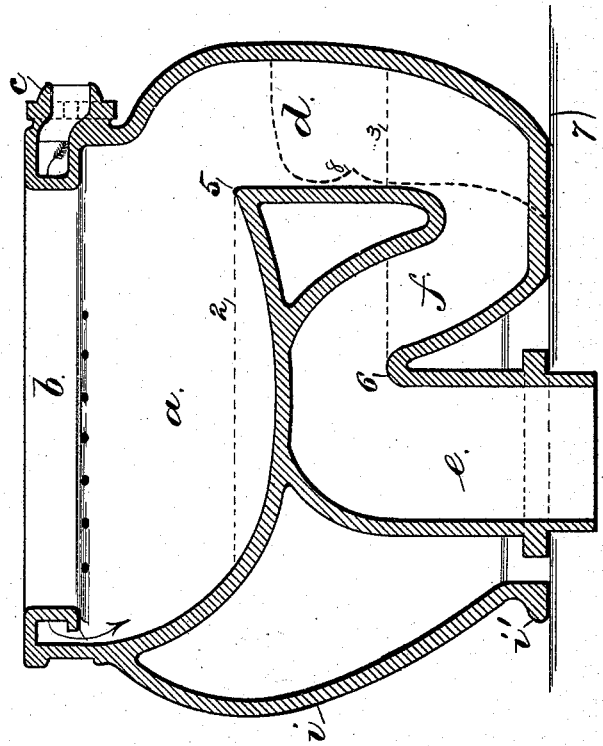
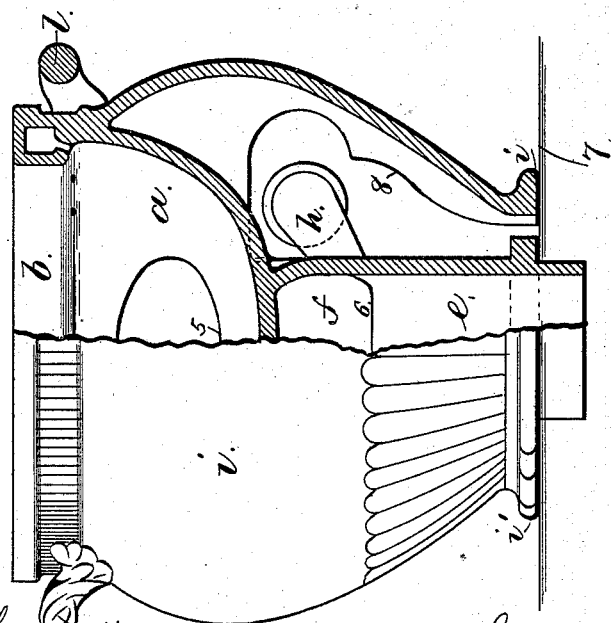
Witnesses
Harold Serrell
Chas. H. Smith
Inventor
John Reid
per Lemuel W. Serrell
atty.

UNITED STATES PATENT OFFICE.

JOHN REID, OF YONKERS, ASSIGNOR TO THE J. L. MOTT IRON WORKS, OF NEW YORK, N. Y.

PORCELAIN WASH-OUT CLOSET.

SPECIFICATION forming part of Letters Patent No. 416,856, dated December 10, 1889.

Application filed February 14, 1889. Serial No. 299,884. (No model.)

*To all whom it may concern:*

Be it known that I, JOHN REID, of Yonkers, in the county of Westchester and State of New York, have invented an Improvement in Porcelain Wash-Out Closets, of which the following is a specification.

My invention is a new article of manufacture consisting of a wash-out closet-bowl, trap, flushing-rim, and a surrounding and supporting skirt, all formed of one piece of porcelain, the flushing-rim surrounding the bowl, the bottom of the bowl forming the top of the trap, and the supporting-skirt extending from the vertical leg of the trap all around the bowl, and having an opening at the back to give access to the interior for cleaning and for the connection to a ventilating-pipe.

In the drawings, Figure 1 is a vertical longitudinal section of the bowl, S-trap, and skirt complete; and Fig. 2 is a partial elevation and vertical cross-section of the same.

a represents the bowl of the wash-out closet, having a flushing-rim at b, and a coupling end at c, to which can be attached a water-supply pipe.

d and e represent the vertical legs of the S-trap, and f the inclined portion, the bottom of the bowl forming the top of the trap.

The dotted lines at 2 in the bowl represent the water-line to a level with the dam 5, and the water-line 3 represents the level in the trap at the dam 6, and at h, Fig. 2, is shown a vent-pipe.

i represents the skirt or face which reaches from nearly the upper edge of the bowl to the floor-line 7, and is made with a flange i', which flange is provided with openings for suitable securing bolts or screws.

The bowl a, the flushing-rim b, the coupling c, the S-trap composed of the portions d, e, and f, and the skirt or face i, together with the vent-pipe h, are all made of porcelain in one piece, and the surface of the face i may be ornamented in any desired manner and provided with handles at l, which, together with the skirt or face, can be shaped to give the appearance of a vase or other pattern or design. The skirt or face i does not extend around back of the vertical leg d of the trap, but unites to the outside of such leg, and the skirt is partially cut away on the line 8 to provide an opening, so that the interior surface of the trap and skirt can be washed and kept clean and the vent-pipe h be connected to a ventilating-pipe.

My improved device is a new and very desirable article of manufacture.

I claim as my invention—

The wash-out closet-bowl, trap, flushing-rim, and supporting-skirt, all formed of one piece of porcelain, the flushing-rim surrounding the bowl, the bottom of the bowl forming the top of the trap, and the supporting-skirt extending from the vertical leg of the trap all around the bowl and having an opening at the back to give access to the interior, substantially as specified.

Signed by me this 9th day of February, A. D. 1889.

JOHN REID.

Witnesses:
HENRY MORFORD,
MAX GOEBEL.